United States Patent
Groβ et al.

(10) Patent No.: US 8,651,147 B2
(45) Date of Patent: *Feb. 18, 2014

(54) APPARATUS FOR INCREASING THE BENDING STRENGTH OF TUBES

(75) Inventors: Stefan Groβ, Trabitz (DE); Harald Neumann, Parkstein (DE)

(73) Assignee: Siemens Aktiengesellschaft, München (DE)

( * ) Notice: Subject to any disclaimer, the term of this patent is extended or adjusted under 35 U.S.C. 154(b) by 612 days.

This patent is subject to a terminal disclaimer.

(21) Appl. No.: 12/688,225

(22) Filed: Jan. 15, 2010

(65) Prior Publication Data

US 2010/0180974 A1   Jul. 22, 2010

(30) Foreign Application Priority Data

Jan. 22, 2009  (DE) .......................... 10 2009 005 643

(51) Int. Cl.
  *F16L 35/00*   (2006.01)
(52) U.S. Cl.
  USPC ..................................... 138/110; 138/DIG. 8
(58) Field of Classification Search
  USPC ..................................... 138/110, 108, DIG. 8
  See application file for complete search history.

(56) References Cited

U.S. PATENT DOCUMENTS

| | | | | |
|---|---|---|---|---|
| 805,579 | A * | 11/1905 | Patchen ......................... | 464/173 |
| 1,880,053 | A * | 9/1932 | Schur et al. .................... | 264/313 |
| 2,172,130 | A * | 9/1939 | Powell .......................... | 138/110 |
| 2,185,741 | A * | 1/1940 | Sorg et al. ..................... | 285/115 |
| 2,544,121 | A * | 3/1951 | Hix et al. ...................... | 138/110 |
| 2,640,502 | A * | 6/1953 | Powers ......................... | 285/114 |
| 2,769,999 | A * | 11/1956 | Sheahan ....................... | 15/327.2 |
| 3,402,741 | A * | 9/1968 | Yurdin .......................... | 138/118 |
| 3,610,289 | A * | 10/1971 | Moss ............................. | 138/90 |
| 3,889,717 | A * | 6/1975 | Obadal et al. ................. | 138/131 |

(Continued)

FOREIGN PATENT DOCUMENTS

| | | |
|---|---|---|
| CN | 2492732 Y | 5/2002 |
| CN | 1914404 A | 2/2007 |

(Continued)

OTHER PUBLICATIONS

German Office Action dated Sep. 23, 2009 with English translation.

(Continued)

*Primary Examiner* — James Hook
(74) *Attorney, Agent, or Firm* — Lempia Summerfield Katz LLC

(57) ABSTRACT

The present embodiments relate to an apparatus which can be used to increase the bending strength of a tube in its connection region. The apparatus may include an adapter unit, the shape of which is matched to a cross-sectional shape of a tube end in such a manner that on the one hand the adapter unit can be fitted to a tube connection of a device instead of the tube end and on the other hand the tube end can be fitted to the adapter unit. The apparatus may also include at least one spring element made of glass fiber reinforced plastic, which is connected to the adapter unit, projects out of the adapter unit in the direction of the tube and has a termination element at the projecting end, against which termination element a fitted tube abuts when subjected to bending, so that the rigidity of the spring element increases the bending strength of the tube in the region between the adapter unit and the element.

16 Claims, 1 Drawing Sheet

(56) References Cited

U.S. PATENT DOCUMENTS

| | | | | |
|---|---|---|---|---|
| 4,327,775 | A | * | 5/1982 | Tally ............................. 138/103 |
| 4,669,508 | A | * | 6/1987 | Neaves ......................... 138/121 |
| 5,246,254 | A | * | 9/1993 | LoJacono et al. ............... 285/16 |
| 5,989,006 | A | * | 11/1999 | Godeau et al. ................. 425/392 |
| 6,105,620 | A | * | 8/2000 | Haberl .......................... 138/118 |
| 6,557,589 | B2 | * | 5/2003 | Bozic et al. ................... 138/106 |
| 6,604,549 | B2 | * | 8/2003 | Gauthier et al. ............... 138/108 |
| 6,901,698 | B2 | * | 6/2005 | Manning ........................ 47/48.5 |
| 7,469,719 | B2 | * | 12/2008 | Gray .............................. 138/33 |
| 7,857,009 | B2 | * | 12/2010 | Gross ............................ 138/110 |

FOREIGN PATENT DOCUMENTS

| | | |
|---|---|---|
| DE | 28 19 328 A1 | 1/1979 |
| EP | 1 396 276 A2 | 3/2004 |
| GB | 1594427 A | 7/1981 |

OTHER PUBLICATIONS

Chinese Office Action dated Feb. 16, 2013 for corresponding Chinese Patent Application No. 201010002861.5 with English translation.

* cited by examiner

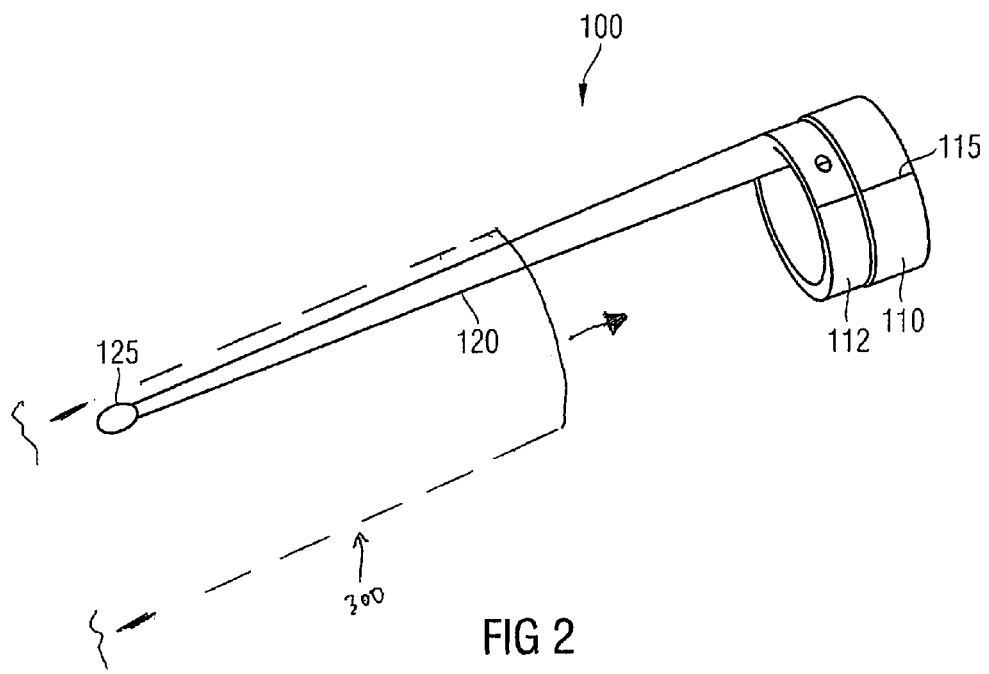
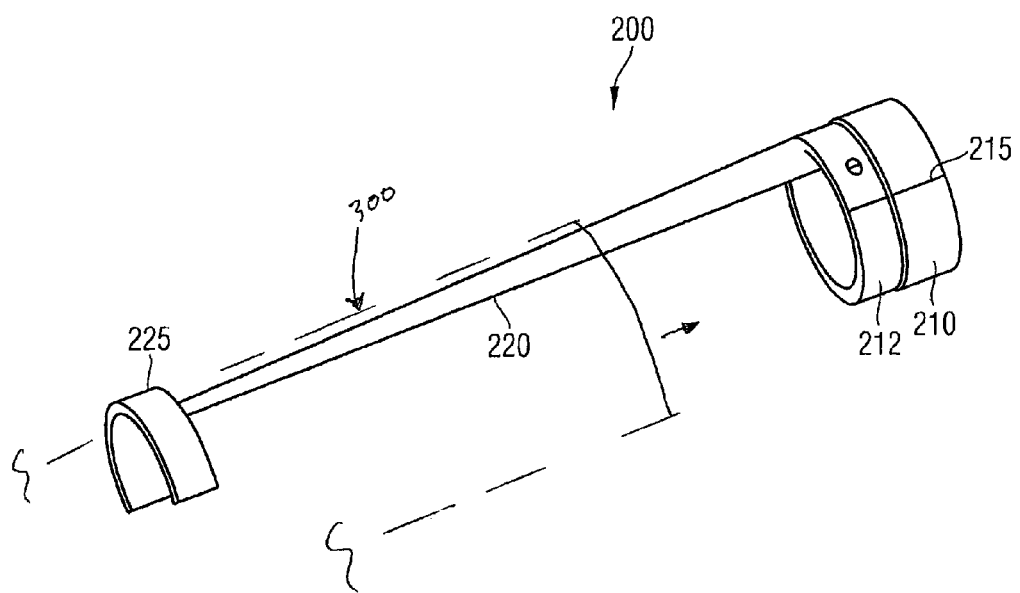

APPARATUS FOR INCREASING THE BENDING STRENGTH OF TUBES

The present patent document claims the benefit of patent document DE 10 2009 005 643.2 filed on Jan. 22, 2009, which is incorporated by reference.

BACKGROUND

The present embodiments relate to increasing the bending strength of a tube in the tube's connection region.

Diverse variants of tubes are found in almost all areas of daily life and technology. They are used as tube lines for carrying solid, liquid, and gaseous substances, for example, where pipelines cannot be used for physical or economic reasons. For example, tubes can be used at movable output and destination sites, in places where access is difficult, or when pipes would be too heavy or expensive. Tubes are also used as a protective sheathing or for insulation purposes.

Cable harnesses, which supply robot arms, are frequently carried in flexible tubes, such as grooved tubes, to protect the cable harnesses from external influences.

Tubes may be manufactured and sold in the form of low-cost goods by the meter, so that it is impossible or very complex to configure different levels of rigidity along a tube. However greater rigidity may be desirable at points where the tube is secured to a device housing and at which the greatest bending regularly occurs, to prevent the tube from kinking at such points and becoming damaged in the process. Long tubes also tend to oscillate when moved in a certain manner and this can also be prevented or at least limited by increased rigidity at the tube connection points.

SUMMARY AND DESCRIPTION

The present embodiments may overcome one or more of the limitations or drawbacks inherent in the related art. For example, in one embodiment, an apparatus, which can be used to increase the bending strength of a tube in its connection region, is provided.

In one embodiment, an apparatus for increasing the bending strength of a tube. The apparatus includes an adapter unit, the shape of the adapter unit being matched to a cross-sectional shape of a tube end of a tube and a tube connection of a device, such that the adapter unit is configured to be fitted to a tube connection of a device and inserted into the tube end of the tube; and at least one spring element connected to the adapter unit and projecting out of the adapter unit in a direction of the tube and having a termination element at a projecting end. The termination element abuts against the tube when the tube is subjected to bending, so that the rigidity of the spring element increases the bending strength of the tube in a region between the adapter unit and the termination element.

The apparatus may make it simple for tubes to be made rigid at the housing connection at a later stage.

In one embodiment, the apparatus may include a number of spring elements of identical or different length. Accordingly, an apparatus may be produced, with which it is possible to achieve a significant increase in the bending strength of the tube in the region of the tube end, while the bending strength gradually decreases in the direction of the tube.

The spring elements may have different levels of rigidity.

In one embodiment, the adapter unit may include two or more parts, the division allowing the adapter unit to be fitted around an object running inside the adapter unit in the fitted state, for example, around a cable harness. The two or more parts may be used for retrofitting already installed systems, in which the tube to be reinforced protects a line running on the inside of a cable harness.

The apparatus may reinforce the tube both from the inside and from the outside. Reinforcement from the outside is advantageous, for example, if the full internal diameter of the tube is required for a given application.

In one embodiment, glass fiber reinforced plastic rods of identical rigidity are used as the spring elements.

BRIEF DESCRIPTION OF THE DRAWINGS

FIG. 1 shows one embodiment of an apparatus increasing the bending strength of a tube; and FIG. 2 shows another embodiment of an apparatus increasing the bending strength of a tube.

DETAILED DESCRIPTION

FIG. 1 shows one embodiment of an apparatus 100, which can be used to increase the bending strength of a tube 300 in a connection region. The apparatus 100 includes an adapter unit 110 and a spring element 120. The adapter unit 110 can be attached to a tube connection of a device instead of the tube 300 and includes a region 112, to which the tube 300 can be fitted. The shape and dimensions of the adapter unit 110 are matched to the shape and dimensions of the tube 300 and the tube connection.

For tubes 300 with an essentially circular cross section, the adapter 110 includes two essentially cylindrical regions of different diameter, the internal diameter of the first region being selected such that it is possible to fit the adapter 110 to the tube connection of the device and the external diameter of the second region 112 being selected such that it is possible to fit the tube 300 to the adapter unit 110.

In one embodiment, the adapter unit 110 includes two parts, which are shown assembled along the line 115. The apparatus 110 may be broken down into two parts and fitted around an object running inside the tube, for example, an inner tube or a cable harness, which is advantageous, when retrofitting the apparatus to constructed devices.

In the example in FIG. 1, a spring element 120 is fastened to the adapter 110. The spring element 120 runs inside the tube which is later pushed onto the apparatus (shown by arrow). The spring element 120 can be a glass fiber reinforced plastic rod. The end of the spring element 120, which is away from the adapter, can terminate with or have a rounded body 125 (sphere or ellipsoid). The purpose of this rod termination is to prevent damage to the cable harness and protect the tube 300 due to relative movement over sharp-edged rod ends. The tube 300 abuts against this rod termination (at any rate when bent in one direction).

FIG. 2 shows a schematic diagram of an apparatus 200 according to a second exemplary embodiment. An adapter unit 210 of the apparatus 200 is embodied in the same manner as the adapter unit 110 of the apparatus 100. To avoid repetition, see the relative explanations relating to FIG. 1.

In the example in FIG. 2, a spring element 220 is secured to the adapter 210, running inside the tube 300 that is pushed onto the apparatus 200 (shown by arrow). The spring element 220 can be a glass fiber reinforced plastic rod. An end of the spring element 220, which is away from the adapter 210, can terminate with or have a holding element 225. The holding element 225 is matched to a cross-sectional shape of the tube 300 and describes at least half a periphery of the tube 300. The holding element 225 can prevent damage to the cable harness and the protect the tube 300 due to relative movement over sharp-edged rod ends. The tube 300 abuts against this holding element.

The shape and dimensions of the holding element 225 are also matched to the shape and dimensions of the cross section of the tube 300. When spring elements 220 run on the inside of the tube 300, the tube 300 is pushed over the holding elements 225. When the spring elements 220 run on the outside of the tube 300, the holding element 225 is inserted into the tube 300.

An essentially circular holding element 225 is shown, which does not describe a full circle, to allow subsequent fitting.

It is possible to dispose a number of spring elements 120, 220 along the periphery of the adapter 110, 210. If these spring elements 120, 220 are of different lengths, it is possible for the rigidity of the apparatus 100, 200 and the tube 300 fitted over to decrease gradually, so that no new sharp kinking points occur at the tube end of the apparatus 100, 200.

It is also possible with spring elements 120, 220 of different rigidities and identical or different lengths to achieve any desired rigidity profile over the length of the apparatus 100, 200. Rods with different rod terminations 125, 225 can be combined for this purpose. Spring elements 120, 220 of different materials can of course also be combined with one another.

Glass fiber reinforced plastic rods are preferably used, which taper in the direction of the holding elements (having a conical profile for example), which then become more flexible further away from the adapter 110, 210, allowing the most consistent rigidity pattern possible.

Although the described exemplary embodiments are adapted for tubes with a circular cross section, the invention is not restricted to circular cross sections. Rather the present invention relates to apparatuses for any tube cross sections, for example for tubes with a rectangular cross section with rounded corners. The invention can be used in conjunction with any types of tube, for example with grooved tubes, articulated tubes, etc.

We claim:

1. An apparatus for increasing the bending strength of a tube, the apparatus comprising:
    an adapter unit having two regions, an internal diameter of a first region of the two regions being sized such that the first region is fittable to a tube connection of a device, and an external diameter of a second region of the two regions being sized such that the tube is fittable to the second region; and
    at least one spring element connected to the adapter unit and projecting out of the adapter unit in a direction of the tube and having a termination element at a projecting end, the termination element comprising a termination body, the termination body having a width greater than a width of the at least one spring element at the projecting end of the at least one spring element, the width of the termination body and the width of the at least one spring element being in a direction perpendicular to the direction of the projection,
    wherein the termination element abuts against the tube when the tube is subjected to bending, so that the rigidity of the at least one spring element increases the bending strength of the tube in a region between the adapter unit and the termination element.

2. The apparatus as claimed in claim 1, wherein the termination body is rounded in the direction of a tube contact point.

3. The apparatus as claimed in claim 2, wherein the termination element is a sphere, a part of a sphere, an ellipsoid or a part of an ellipsoid.

4. The apparatus as claimed in claim 1, wherein the termination element is a holding element matched to a cross-sectional shape of the tube and describes at least half a periphery of the tube.

5. The apparatus as claimed in claim 4, wherein the adapter unit includes at least a first part and a second part, the first part configured to allow the adapter unit to be fitted around an object fitted inside the first part of the adapter unit.

6. The apparatus as claimed in claim 5, wherein the object is a cable harness.

7. The apparatus as claimed in claim 1, wherein the at least one spring element includes a plurality of spring elements of identical length.

8. The apparatus as claimed in claim 7, wherein the spring elements have different rigidities.

9. The apparatus as claimed in claim 1, wherein the at least one spring element includes a plurality of spring elements having different lengths, so that a significant increase is achievable in the bending strength of the tube in the region of the adapter unit, said bending strength gradually decreasing in the direction of the tube.

10. The apparatus as claimed in claim 1, wherein the at least one spring element runs inside the fitted tube.

11. The apparatus as claimed in claim 1, wherein the at least one spring element runs outside the tube.

12. The apparatus as claimed in claim 1, wherein the at least one spring element includes a plurality of spring elements, and
    wherein the plurality of spring elements are rods of identical rigidity.

13. The apparatus as claimed in claim 12, wherein the rods are made of glass fiber reinforced plastic.

14. The apparatus as claimed in claim 1, wherein the at least one spring element is made of glass fiber reinforced plastic.

15. An apparatus for increasing the bending strength of a tube, the apparatus comprising:
    an adapter unit, the shape of the adapter unit being matched to a cross-sectional shape of a tube end of a tube and a tube connection of a device, such that the adapter unit is configured to be fitted to a tube connection of a device and inserted into the tube end of the tube; and
    at least one spring element connected to the adapter unit and projecting out of the adapter unit in a direction of the tube and having a termination element at a projecting end, the termination element comprising a termination body,
    wherein the termination element abuts against the tube when the tube is subjected to bending, so that the rigidity of the at least one spring element increases the bending strength of the tube in a region between the adapter unit and the termination element, and
    wherein the at least one spring element includes a plurality of spring elements of identical length.

16. An apparatus for increasing the bending strength of a tube, the apparatus comprising:
    an adapter unit, the shape of the adapter unit being matched to a cross-sectional shape of a tube end of a tube and a tube connection of a device, such that the adapter unit is configured to be fitted to a tube connection of a device and inserted into the tube end of the tube; and
    at least one spring element connected to the adapter unit and projecting out of the adapter unit in a direction of the tube and having a termination element at a projecting end, the termination element comprising a termination body, wherein the termination element abuts against the tube when the tube is subjected to bending, so that the rigidity of the at least one spring element increases the bending strength of the tube in a region between the adapter unit and the termination element, and wherein the at least one spring element includes a plurality of spring elements having different lengths, so that a significant increase is achievable in the bending strength of the tube in the region of the adapter unit, said bending strength gradually decreasing in the direction of the tube.

* * * * *